(12) United States Patent
Cao et al.

(10) Patent No.: US 11,923,703 B2
(45) Date of Patent: Mar. 5, 2024

(54) POWER SOURCE CURRENT BALANCING SYSTEM AND METHOD

(71) Applicant: Microsoft Technology Licensing, LLC, Redmond, WA (US)

(72) Inventors: Zhuo Yi Cao, Fremont, CA (US); Martin Francis Galinski, III, Santa Clara, CA (US); Chang Joon Park, Sunnyvale, CA (US); Mike Voong, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/559,734

(22) Filed: Dec. 22, 2021

(65) Prior Publication Data

US 2023/0198270 A1   Jun. 22, 2023

(51) Int. Cl.
*H02J 7/00*    (2006.01)
(52) U.S. Cl.
CPC ........ *H02J 7/0016* (2013.01); *H02J 7/00036* (2020.01); *H02J 7/0063* (2013.01); *H02J 7/00712* (2020.01)
(58) Field of Classification Search
CPC .... H02J 7/0016; H02J 7/00036; H02J 7/0063; H02J 7/00712
See application file for complete search history.

(56) References Cited

U.S. PATENT DOCUMENTS

| 10,199,833 | B1 | 2/2019 | Bucher et al. | |
|---|---|---|---|---|
| 2011/0006735 | A1* | 1/2011 | Wu | H02J 7/00036 320/125 |
| 2014/0167684 | A1* | 6/2014 | Miyanaga | H02J 7/0016 320/162 |
| 2014/0203780 | A1 | 7/2014 | Hu et al. | |
| 2017/0141589 | A1 | 5/2017 | Inoue et al. | |
| 2017/0264123 | A1* | 9/2017 | Mulawski | H02J 9/062 |
| 2018/0219389 | A1 | 8/2018 | Binder et al. | |

FOREIGN PATENT DOCUMENTS

| CN | 102157972 B | 12/2013 |
|---|---|---|
| CN | 104410133 B | 2/2017 |
| CN | 206820489 U | 12/2017 |
| CN | 105406526 B | 4/2018 |
| CN | 105870997 B | 5/2018 |
| CN | 112737017 A | 4/2021 |

OTHER PUBLICATIONS

Tang, Ming, et al., "Selective Buck-Boost Equalizer for Series Battery Packs", In Journal of IEEE Transactions on Aerospace and Electronic Systems, vol. 36, Issue 1, Jan. 2000, pp. 201-211.
"International Search Report and Written Opinion Issued in PCT Application No. PCT/US22/0481140", dated Feb. 21, 2023, 12 Pages.

* cited by examiner

*Primary Examiner* — Lincoln D Donovan
*Assistant Examiner* — Alex W Lam
(74) *Attorney, Agent, or Firm* — Schwegman Lundberg & Woessner, P.A.

(57) ABSTRACT

A system includes a first sense circuit configured to provide a first output representative of sensed current provided by a first battery coupled to a first load. A second sense circuit is configured to provide a second output representative of sensed current provided by a second battery coupled to the first load. An input current controller is coupled to receive the respective first and second outputs and to couple between the second battery and the first load to control the current provided by the second battery.

11 Claims, 6 Drawing Sheets

POWER SOURCE CURRENT BALANCING SYSTEM AND METHOD

BACKGROUND

Some devices utilize more than one independent battery to power multiple loads. The loads may be interconnected such that the batteries operate together to provide power to the loads. Parasitic resistances in the current paths and variations between the current drawn by the loads can present an imbalance causing one battery to discharge below a cut off limit before another battery. One battery reaching the cut off limit before another battery may impose a premature shutdown of the overall system. Premature shutdowns can accelerate aging of one battery before the other battery.

SUMMARY

A system includes a first sense circuit configured to provide a first output representative of sensed current provided by a first battery coupled to a first load. A second sense circuit is configured to provide a second output representative of sensed current provided by a second battery coupled to the first load. An input current controller is coupled to receive the respective first and second outputs and to couple between the second battery and the first load to control the current provided by the second battery.

DETAILED DESCRIPTION

Figure 1:
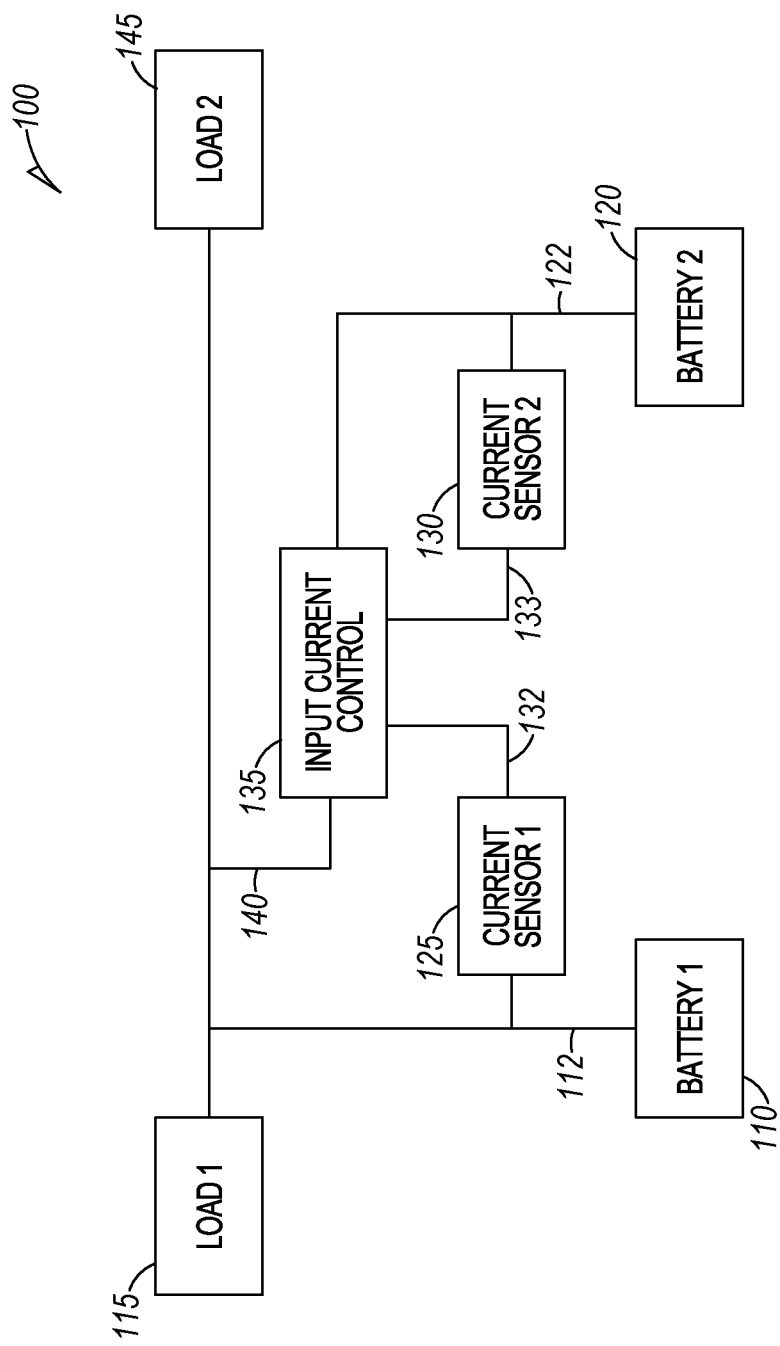
FIG. 1 is a block schematic diagram of a system for controlling battery current supplied to one or more electrically interconnected loads according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

In a system with two batteries providing current to two independent loads via current branches, parasitic resistances in current branch paths and variations between the loads in the two branches can present an imbalance at the battery inputs. Such imbalances can cause one battery to discharge below a cut off limit before the other battery. One battery reaching the cut off limit first, may impose a premature shutdown of the overall system, accelerate aging of one battery before the other one. The parasitic resistance between the batteries due to conductor trace length and thickness differences, can cause unwanted power dissipation and possible triggering of protection circuits within the batteries when the two batteries source or sink each other in response to being at different initial capacity or state of charge.

A circuit and system senses current from two batteries that provide current to one or more loads and uses a difference in the sensed current to control at least one of the batteries while still providing sufficient current to the one or more loads. Such control can be used to avoid having the batteries reach cut off limits at different times.

FIG. 1 is a block schematic diagram of a system 100 for controlling battery current supplied to one or more interconnected loads. System 100 includes a first battery 110 that provides current on a conductor 112 for coupling to a first load 115. A second battery 120 also provides current on a conductor 122. A first current sensor 125 is coupled to conductor 112 to measure current provided by the first battery 110. Similarly, a second current sensor 130 is coupled to conductor 122 to measure current provided by the second battery 120.

Signals representative of the sensed currents are provided on conductors 132 and 133 to an input current controller 135. Input current controller 135 is also coupled to conductor 122 to receive current from the second battery 120. The input current controller 135 operates to control the amount of current provided by second battery 120 by modifying an output voltage on a conductor 140 that is coupled to the first load 115 and optionally a second load 145 that is interconnected with first load 115. In one example, the voltage controller 135 operates to ensure that the first and second batteries source equal amounts of current.

In one example, system 100 may be used in a mixed reality headset device, such as glasses that contain a battery in each frame stem. Loads may also be disposed throughout the frame. The loads may have different current requirements. The conductive traces or paths between the batteries and loads may have different resistances and impedances due to different serial path lengths and thicknesses. Even the batteries may have different initial charges or even different capacities. Equalizing the current by controlling the voltage can help ensure that the batteries can discharge for a fairly equal amount of time before reaching their cut off limits, potentially extending runtime of the system and increasing overall battery life, reliability, and safety.

In further examples, additional batteries and corresponding current sensors and input current controllers may be added for each additional battery. In such examples, the input current controllers would compare current from the first battery to current for an additional battery in order to equalize the current from the additional battery to that from the first battery.

Figure 2:
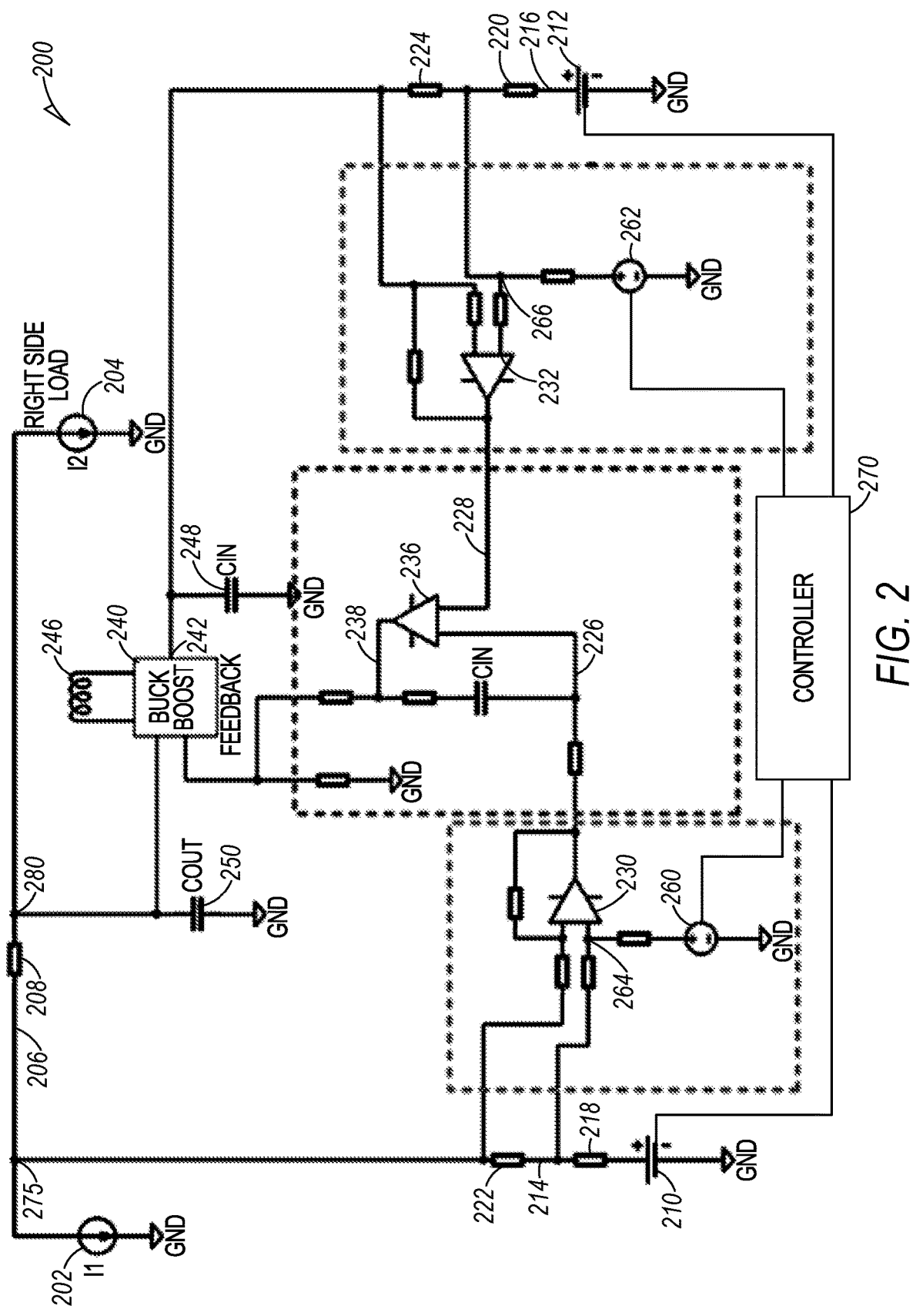
FIG. 2 is a circuit diagram of a circuit for implementing battery current control for a device having multiple independent batteries providing current to one or more interconnected loads according to an example embodiment.

FIG. 2 is a circuit diagram of a circuit 200 for implementing battery current control for a device having multiple independent batteries providing current to one or more interconnected loads 202 and 204 coupled via a conductor 206 having an interconnection resistance 208. Circuit 200 includes a left battery 210 and a right battery 212, each coupled to ground. Cell impedances are represented as rectangles 218 and 220 in series with respective conductors 214 and 216. Other impedances/resistances are indicated throughout circuit 200 as rectangles in line with conductors.

Respective current sense resistors 222 and 224 are coupled in series with conductors 214 and 216, with battery current flowing through each sense resistor 222, 224. Current sense operational amplifiers 230 and 232 have inputs coupled across the respective current sense resistors 222 and 224 to provide respective outputs 226 and 228 representative of the currents provided by the first and second batteries 210 and 212.

A voltage compare operational amplifier 236 is coupled to receive the outputs 226 and 228 and provide a feedback output 238 to a buck boost converter 240. Buck boost converter 240 has an input 242 coupled to receive current from the second battery 212 and to generate an output voltage on an output conductor 244. In one example, the feedback output 238 is used to control the output voltage on conductor 244 to equalize the amount of current provided by each of the batteries 210 and 212.

In one example, buck boost converter 240 is a four-switch converter such as an LTC®3111 fixed frequency, synchronous buck-boost DC/DC converter. The converter 240 acts as an input current regulator in response to the feedback output 238. Inductance of the buck boost converter 240 is indicated at 246. Input capacitance is indicated at 248 and output capacitance is indicated at 250. While a buck boost converter is used, any other device capable of acting as an input current regulator may be used.

The two current sense resistors 222 and 224 are placed in series with the batteries on two branches—conductors 214 and 216, where the currents through the branches are monitored as voltages across the resistors 222 and 224, then amplified with a programmable offset. These two voltages are compared via operational amplifier 236 where the error between them is integrated and buffered to drive the buck boost converter 240 operating as a switching power supply. The buck boost output voltage on conductor 244 as a result, will slew up and down based on the difference in the battery currents, essentially closing a loop that will ensure the two batteries will source equal amounts of current. Circuit 200 can work in an environment where the two system voltages are required to power different load profiles and will actively match the battery discharge current at the input of the system. When in a standby state, the buck boost 240 acts as a buffer ensuring the two system voltages are equal potential, so when there are two batteries with different open circuit potential, one does not discharge into the other.

Discharge rates of the batteries 212 and 214 may be controlled by use of respective offset voltages 260 and 262, each coupled to a respective input 264 and 266 of the operational amplifiers 230 and 232. A battery discharge controller 270, such as a microcontroller, is coupled to control the offset voltages 260 and 262. The controller 270 is also coupled to receive data from batteries 210 and 212. Such data may be provided by one or more battery fuel gauges that may be integrated into batteries. Some gauges calculate remaining charge based on battery voltages and others operate based on a known full charge and monitoring the discharge. The known full charge may be modified following recharging to adjust for changes in the battery capacity over time.

The respective operational amplifier inputs 264 and 266 are also coupled to the outputs of the batteries on conductors 214 and 216. By controlling the offset voltages 260 and 262, which are coupled (not shown for ease of illustration) to an interconnection conductor 206 to receive power, the discharge rates of both batteries may be controlled to equalize the battery runtimes by supplying more or less current from the offsets 260, 262. Control provided by controller 270 can balance input current to the loads 202, 204 based on battery state of charge. The controller 270 may be a microcontroller with an inter-integrated circuit (I2C) communication port and two digital-to-analog converter (DAC) outputs. The controller 270 may also receive power via interconnection conductor 206 such that the entire circuit 200 receives power from the batteries.

Figure 3:
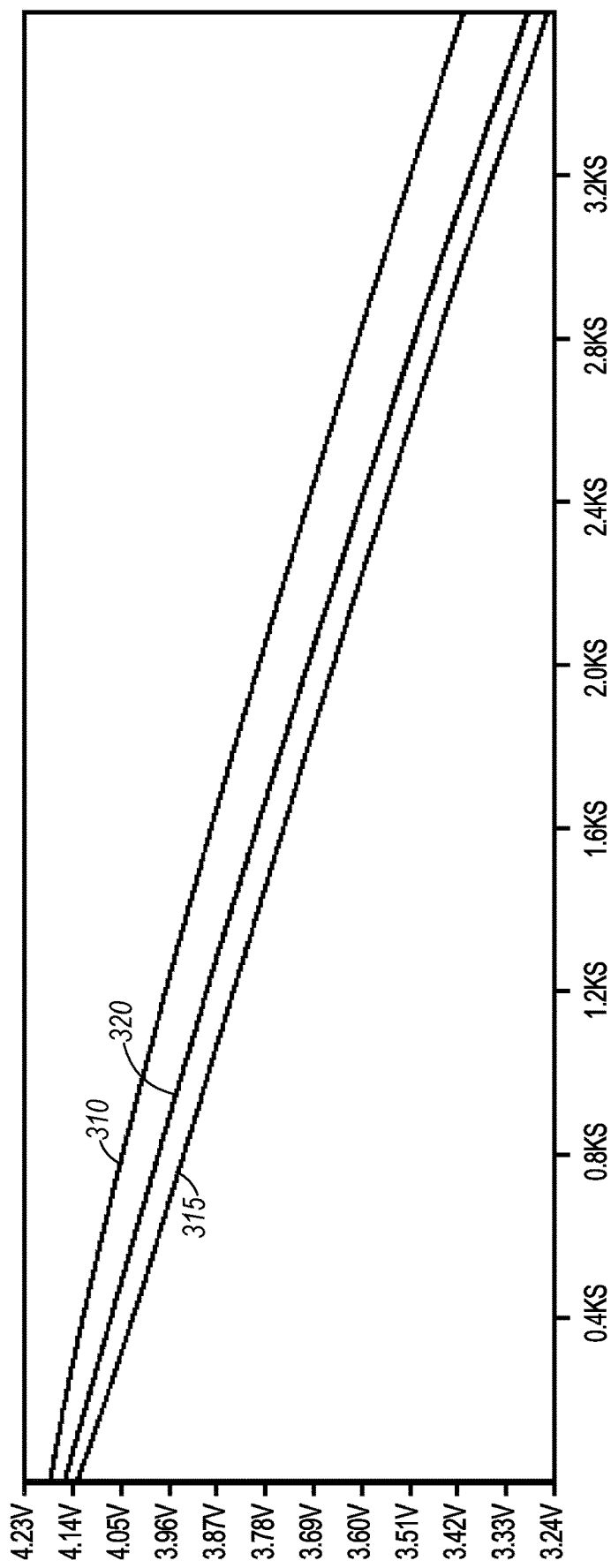
FIG. 3 is a graph indicating battery voltage in volts over time, represented in kilo seconds, comparing the voltage of various batteries according to an example embodiment.

FIG. 3 is a graph 300 indicating battery voltage in volts over time, represented in kilo seconds, comparing voltages of two unbalanced batteries indicated by traces 310 and 315, compared to a trace 320 that represents the voltage of two balanced batteries. The single trace 320 is used to represent the voltages of the two balanced batteries, as there is too small a difference in voltages to represent conveniently when the balanced batteries are controlled by circuit 200. In other words, the voltage differences of the unbalanced batteries are much larger than that of the balanced batteries in this example. In the rare case that impedances and loads for each battery are identical, the difference between unbalanced batteries would likely not be as large.

Figure 4:
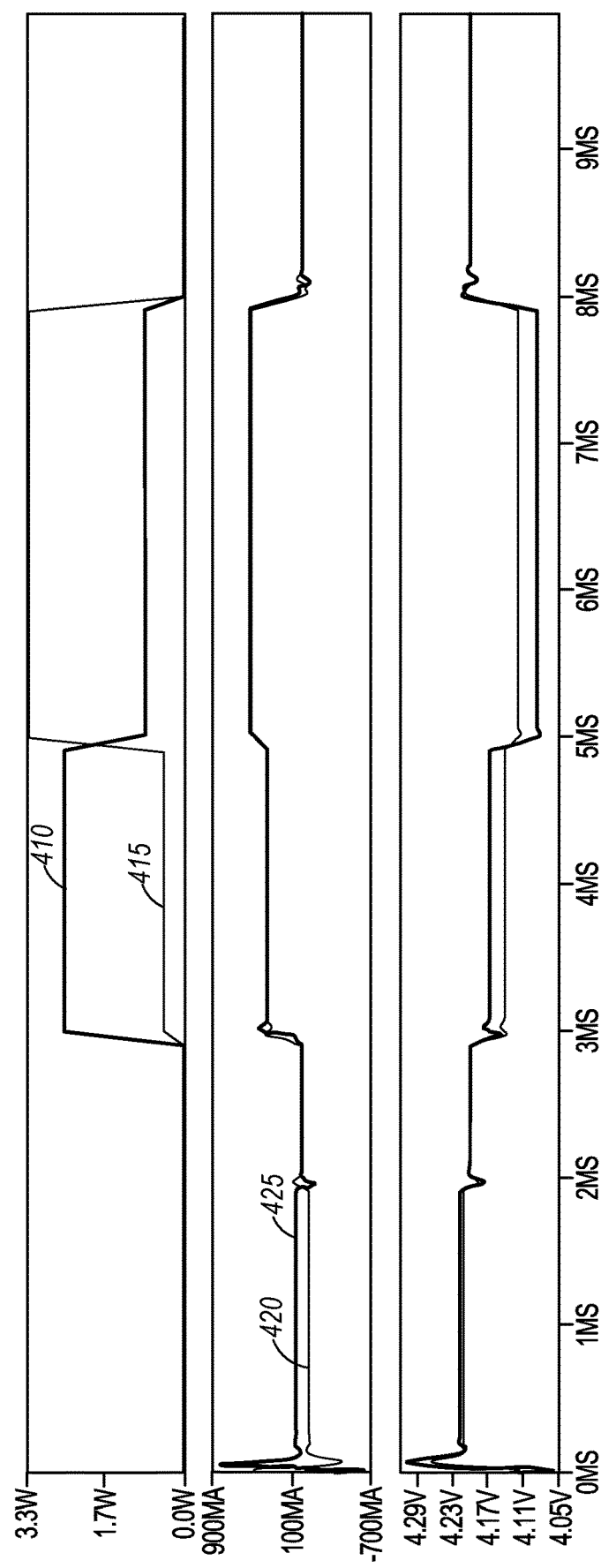
FIG. 4 is a timing diagram indicating various simulated signals occurring during use of circuit to equalize battery currents according to an example embodiment.

FIG. 4 is a timing diagram 400 indicating various simulated signals occurring during use of circuit 200 to equalize battery currents. Traces 410 and 415 represents power in watts over time provided to the loads 204 and 206. Respective battery currents in milliamps are represented by traces 420 and 425 for batteries 210 and 212. The currents track each other fairly well, even as the power consumed by the loads varies greatly as seen from 3 to 8 milliseconds. Similarly, voltage traces 430 and 435, corresponding to the voltages provided to each load indicated at 275 and 280 also track fairly closely, with the differences due to interconnect 280 impedance differences.

Figure 5:
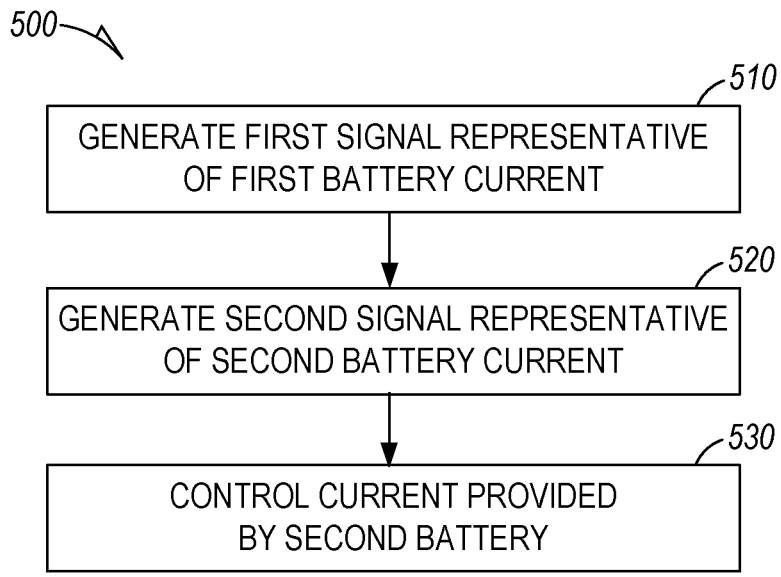
FIG. 5 is a flowchart illustrating a method of equalizing current between two independent batteries driving one or more interconnected loads according to an example embodiment.

FIG. 5 is a flowchart illustrating a method 500 of equalizing current between two independent batteries driving one or more interconnected loads. Method 500 begins by generating, at operation 510, a first signal representative of current being provided by a first battery coupled to a first load. At operation 520, a second signal is generated that is representative of current being provided by a second battery coupled to the first load. The first and second sense circuits may be formed with amplifiers having inputs for coupling across respective first and second current sense resistors coupled to receive current from the first and second batteries.

The current being provided by the second battery is controlled at operation 530 as a function of a difference between the first and second signals. In one example, the current provided by the second battery is controlled to be equal to the current provided by the first battery. Controlling the current being provided by the second battery may be performed by controlling a buck boost converter that is in a current path between the second battery and the first load.

Figure 6:
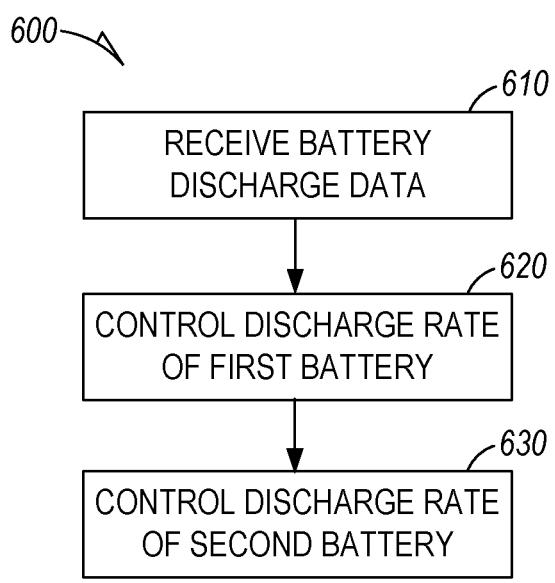
FIG. 6 is a flowchart illustrating a method of controlling battery discharge rates according to an example embodiment.

FIG. 6 is a flowchart illustrating a method 600 of controlling battery discharge rates. Method 600 may be performed concurrently with method 500 in one example. Method 600 begins at operation 610 by receiving battery discharge data corresponding to the first and second batteries. A discharge rate of the first battery is controlled as a function of the discharge data at operation 620 and a discharge rate of the second battery is controlled at operation 630 as a function of the discharge data. The first and second discharge rates may be controlled to equalize a time of suitable discharge for the first and second batteries even in the case of the first and second batteries having different charge capacities.

Figure 7:
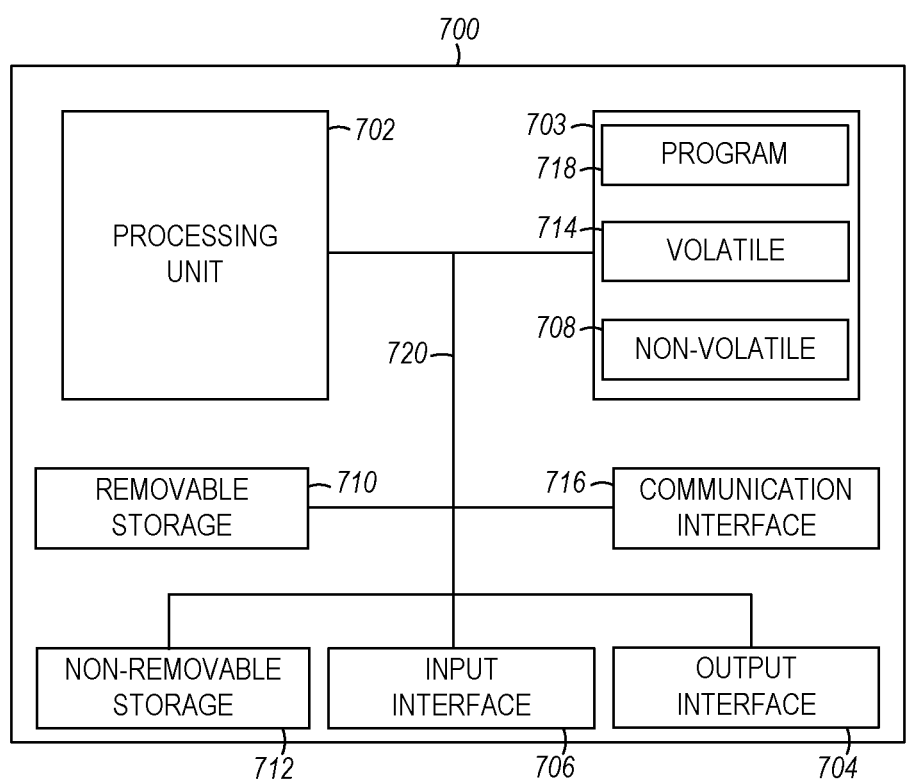
FIG. 7 is a block schematic diagram of a computer system to implement one or more example embodiments.

FIG. 7 is a block schematic diagram of a computer system 700 for executing code to control battery discharge rates, for utilizing circuitry to control battery currents, and for performing methods and algorithms according to example embodiments. All components need not be used in various embodiments.

One example computing device in the form of a computer 700 may include a processing unit 702, memory 703, removable storage 710, and non-removable storage 712. Although the example computing device is illustrated and described as computer 700, the computing device may be in different forms in different embodiments. For example, the computing device may instead be a smartphone, a tablet, smartwatch, smart storage device (SSD), or other computing device including the same or similar elements as illustrated and described with regard to FIG. 7. Devices, such as smartphones, tablets, and smartwatches, are generally collectively referred to as mobile devices or user equipment.

Although the various data storage elements are illustrated as part of the computer 700, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 703 may include volatile memory 714 and non-volatile memory 708. Computer 700 may include—or have access to a computing environment that includes—a variety of computer-readable media, such as volatile memory 714 and non-volatile memory 708, removable storage 710 and non-removable storage 712. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 700 may include or have access to a computing environment that includes input interface 706, output interface 704, and a communication interface 716. Output interface 704 may include a display device, such as a touchscreen, that also may serve as an input device. The input interface 706 may include one or more of a touchscreen, touchpad, mouse, keyboard, camera, one or more device-specific buttons, one or more sensors integrated within or coupled via wired or wireless data connections to the computer 700, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 700 are connected with a system bus 720.

Computer-readable instructions stored on a computer-readable medium are executable by the processing unit 702 of the computer 700, such as a program 718. The program 718 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 718 along with the workspace manager 722 may be used to cause processing unit 702 to perform one or more methods or algorithms described herein.

EXAMPLES

1. A system includes a first sense circuit configured to provide a first output representative of sensed current provided by a first battery coupled to a first load. A second sense circuit is configured to provide a second output representative of sensed current provided by a second battery coupled to the first load. An input current controller is coupled to receive the respective first and second outputs and to couple between the second battery and the first load to control the current provided by the second battery.

2. The system of example 1 wherein the current provided by the second battery is controlled to be equal to the current provided by the first battery.

3. The system of any of examples 1-2 and further including a second load coupled to the first and second batteries.

4. The system of any of examples 1-3 wherein the first and second sense circuits include amplifiers having inputs for coupling across respective first and second current sense resistors coupled to receive current from the first and second batteries.

5. The system of any of examples 1-4 and further including a controller configured to receive battery discharge data corresponding to the first and second batteries, a first voltage offset coupled to the controller and the first sense circuit, and configured to couple to the first battery to control a discharge rate of the first battery, and a second voltage offset coupled to the controller and the second sense circuit, and configured to couple to the second battery to control a discharge rate of the second battery.

6. The system of example 5 wherein the controller controls the first and second discharge rates to equalize a discharge run time for the first and second batteries.

7. A circuit includes a first sense circuit configured to provide a first output representative of sensed current provided by a first battery coupled to a first load, a second sense circuit configured to provide a second output representative of sensed current provided by a second battery coupled to the first load, a compare circuit, coupled to the respective first and second outputs, to provide a third output representative of the difference between the first and second outputs, and a buck boost converter, coupled to receive the third output, and configured to couple between the first load and the second battery to control the current provided by the second battery.

8. The circuit of example 7 wherein the current provided by the second battery is controlled to be equal to the current provided by the first battery.

9. The circuit of any of examples 7-8 and further including a second load coupled to the first and second batteries.

10. The circuit of example 9 wherein the first and second sense circuits include amplifiers having inputs for coupling across respective first and second current sense resistors coupled to receive current from the first and second batteries.

11. The circuit of any of examples 7-10 wherein the compare circuit includes an amplifier coupled to receive the first and second outputs.

12. The circuit of any of examples 7-11 and further including a controller configured to receive battery discharge data corresponding to the first and second batteries, a first voltage offset coupled to the controller, the first sense circuit, and configured to couple to the first battery to control a discharge rate of the first battery, and a second voltage offset coupled to the controller, the second sense circuit, and configured to couple to the second battery to control a discharge rate of the second battery.

13. The circuit of example 12 wherein the controller controls the first and second discharge rates to equalize a time of suitable discharge for the first and second batteries.

14. The circuit of any of examples 7-13 and further including the first and second batteries.

15. The circuit of example 14 wherein the first and second batteries have different charge capacities.

16. A method includes generating a first signal representative of current being provided by a first battery coupled to a first load, generating a second signal representative of current being provided by a second battery coupled to the first load, and controlling the current being provided by the second battery as a function of a difference between the first and second signals.

17. The method of example 16 wherein the current provided by the second battery is controlled to be equal to the current provided by the first battery.

18. The method of any of examples 16-17 wherein controlling the current being provided by the second battery comprises controlling a buck boost converter in a current path between the second battery and the first load.

19. The method of any of examples 16-18 wherein the first and second sense circuits include amplifiers having inputs for coupling across respective first and second current sense resistors coupled to receive current from the first and second batteries.

20. The method of any of examples 16-19 and further including receiving battery discharge data corresponding to the first and second batteries, controlling a discharge rate of the first battery as a function of the discharge data, and controlling a discharge rate of the second battery as a function of the discharge data.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A system comprising:
    a first sense circuit configured to provide a first output representative of sensed current provided by a first battery coupled to a first load;
    a second sense circuit configured to provide a second output representative of sensed current provided by a second battery coupled to the first load; and
    an input current controller, coupled to receive the respective first and second outputs, and configured to couple between the second battery and the first load to control the current provided by the second battery as a function of a difference between the first and second outputs to equalize run times of the first battery and the second battery.

2. The system of claim 1 wherein the current provided by the second battery is controlled to be equal to the current provided by the first battery.

3. The system of claim 1 and further comprising a second load coupled to the first and second batteries.

4. The system of claim 1 wherein the first and second sense circuits comprise amplifiers having inputs for coupling across respective first and second current sense resistors coupled to receive current from the first and second batteries.

5. The system of claim 1 and further comprising:
a controller configured to receive battery discharge data corresponding to the first and second batteries;
a first voltage offset coupled to the controller and the first sense circuit, and configured to couple to the first battery to control a discharge rate of the first battery; and
a second voltage offset coupled to the controller and the second sense circuit, and configured to couple to the second battery to control a discharge rate of the second battery.

6. The system of claim 5 wherein the controller controls the first and second discharge rates to equalize a discharge run time for the first and second batteries.

7. A system comprising:
a first sense circuit configured to provide a first output representative of sensed current provided by a first battery coupled to a first load;
a second sense circuit configured to provide a second output representative of sensed current provided by a second battery coupled to the first load; and
an input current controller, coupled to receive the respective first and second outputs, and configured to couple between the second battery and the first load to control the current provided by the second battery, wherein the input current controller comprises:
a compare circuit, coupled to the respective first and second outputs, to provide a third output representative of the difference between the first and second outputs; and
a buck boost converter, coupled to receive the third output, and configured to couple between the first load and the second battery to control the current provided by the second battery.

8. The system of claim 7 wherein the compare circuit comprises an amplifier coupled to receive the first and second outputs.

9. The system of claim 7 and further comprising the first and second batteries.

10. The system of claim 9 wherein the first and second batteries have different charge capacities.

11. A system comprising:
a first sense circuit configured to provide a first output representative of sensed current provided by a first battery coupled to a first load;
a second sense circuit configured to provide a second output representative of sensed current provided by a second battery coupled to the first load; and
an input current controller, coupled to receive the respective first and second outputs, and configured to couple between the second battery and the first load to control the current provided by the second battery, wherein the input current controller comprises:
a compare circuit, coupled to the respective first and second outputs, to provide a third output representative of the difference between the first and second outputs; and
an input current regulator, coupled to receive the third output, and configured to couple between the first load and the second battery to control the current provided by the second battery.

* * * * *